United States Patent [19]

Fujiki

[11] 4,016,566
[45] Apr. 5, 1977

[54] METHOD FOR AVOIDING UNWANTED ECHO SIGNALS AND AUTOMOTIVE RADAR EMBODYING SAME

[75] Inventor: Norio Fujiki, Yokohama, Japan

[73] Assignee: Nissan Motor Co., Ltd., Yokohama, Japan

[22] Filed: Dec. 22, 1975

[21] Appl. No.: 643,128

[30] Foreign Application Priority Data

Dec. 24, 1974 Japan .............................. 49-1561

[52] U.S. Cl. ..................... 343/7 VM; 343/112 CA
[51] Int. Cl.² ........................................... G01S 9/04
[58] Field of Search ................. 343/7 VM, 112 CA

[56] References Cited

UNITED STATES PATENTS

| 2,996,137 | 8/1961 | Chu et al. ................. 343/7 VM X |
| 3,689,882 | 9/1972 | Dessailly .................... 343/7 VM X |
| 3,735,398 | 5/1973 | Ross ............................. 343/7 VM |
| 3,952,303 | 4/1976 | Watanabe et al. ......... 343/7 VM X |

*Primary Examiner*—Malcolm F. Hubler

[57] ABSTRACT

An automotive radar is provided with a device for sensing the location of the entry and exit ways of a zone as the vehicle passes therethrough to reduce the detectable range of the radar upon the vehicle entering the zone so that false targets within the range-controlled zone are discriminated from valid targets. The device restores the range upon the vehicle leaving the zone to normal range.

11 Claims, 9 Drawing Figures

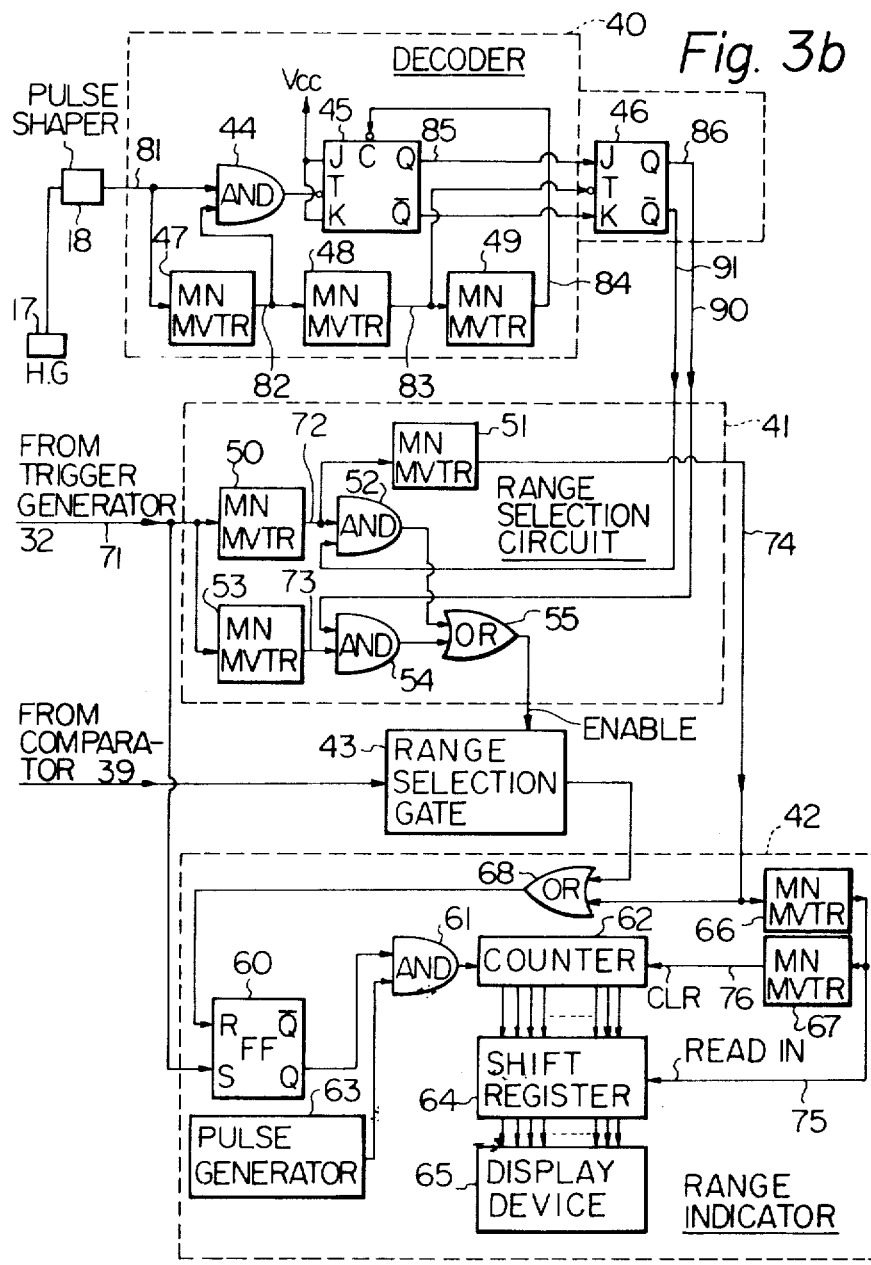

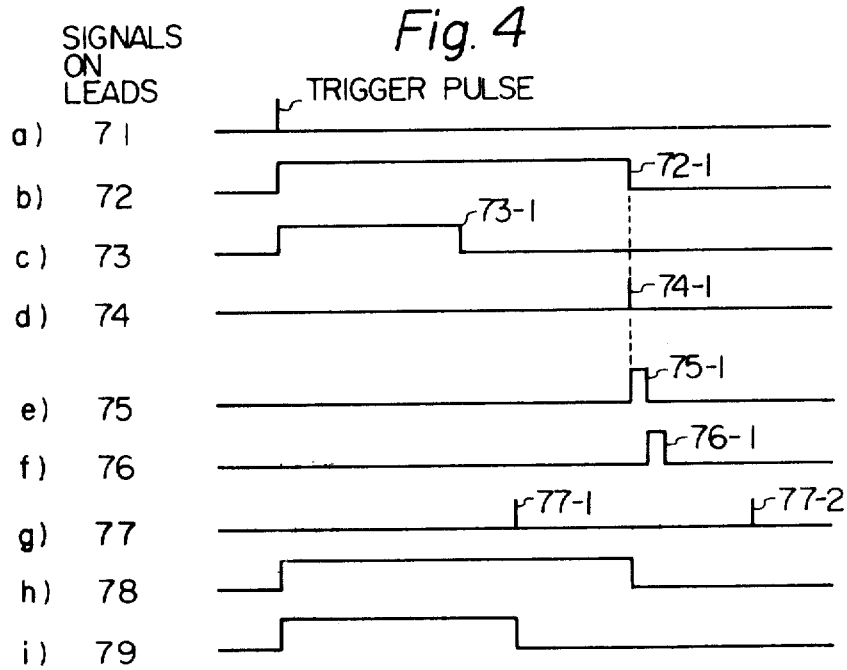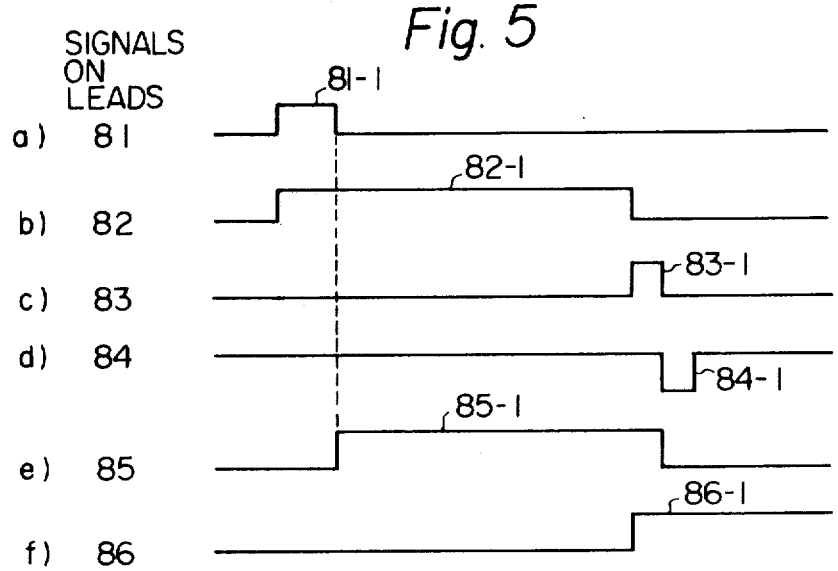

METHOD FOR AVOIDING UNWANTED ECHO SIGNALS AND AUTOMOTIVE RADAR EMBODYING SAME

The present invention relates to an automotive collision avoidance system, and in particular to a method for discriminating unwanted echo signals reflected from false targets such as road barriers, sign posts, guard rails, or any objects in the neighborhood of a traffic lane, and an apparatus for embodying the same.

The use of a radar system on a motor vehicle for detecting objects in front provides an effective means of avoiding collision by alerting the vehicle driver in advance of approaching the objects or by automatically braking the vehicle. However, in the prior art vehicle-equipped radar system, the detectable range of the system is not variable and tends to respond to unwanted echo signals reflected from false targets such as a portion of guard rail or sign posts set up on a curved roadway when such targets come within the detectable range of the radar. Such unwanted echo signals present an annoying problem if the vehicle occupant is frequently alerted by false signals or the vehicle is automatically braked thereby. Another problem is that the vehicle driver must override the system to reduce the detectable range of the system whenever the vehicle leaves a highway where a long range of detection is favorable and enters a traffic congested city zone where the effective range of detection is only limited to nearby targets because of the so-called radar clutter which is abundant in the built-up area.

The primary object of the present invention is therefore to control the detectable range of a radar system equipped on a motor vehicle when the vehicle is approaching an unwanted stationary object or within a controlled zone in which the unwanted object is located.

Briefly described, the entry and exit of an area of roadway in which unwanted stationary objects are located, are provided with indicators or markings to distinguish from the surface of the other areas of the roadway. A sensor is provided on the vehicle to detect the presence of such indicators or markings upon entry to the area to reduce the detectable range of a radar system equipped on the vehicle to a short range to prevent the signal reflected from the false targets from triggering an emergency action. Upon leaving the exit of the area, the sensor is again operated to restore the range to the normal long range to permit the emergency action to be triggered by a signal returned from distant or valid objects. In one embodiment of the invention, the range control is effected in a pulsed radar system by controlling the on-time of a range selection gate which enables only those signals which return from targets immediately in front of the vehicle. Since the signal that is returned from a distant object is received by the radar system at a later time than the signal reflected from a nearby object is received, the on-time of the gate is reduced in response to the sensing of the entry to the range-controlled area such that the gate is closed before the distant signal reaches the receiver system. The gate on-time is restored to the normal value upon the vehicle leaving the exit of the range-controlled area. In another embodiment, the range control is provided in a continuous wave Doppler radar system by controlling the voltage level of the received signal relative to a threshold level. Since the signal returned from a distant object is roughly considered to have a signal intensity smaller than the signal returned from a nearby object, the voltage level of the received signal is attenuated by a predetermined amount in response to the detection of the entry of the range-controlled area and the attenuation is removed in response to the sensing of the exit of the area.

The indicators or markings may also be provided at the junction of a highway and a built-up area in order to reduce the range of the radar in the built-up area.

These and other objects, features and advantages of the present invention will be understood from the following description taken in conjunction with the accompanying drawings, in which:

FIGS. 4 to 6 are waveform diagrams useful for describing the operation of the circuit of FIG. 3;

Figure 1:
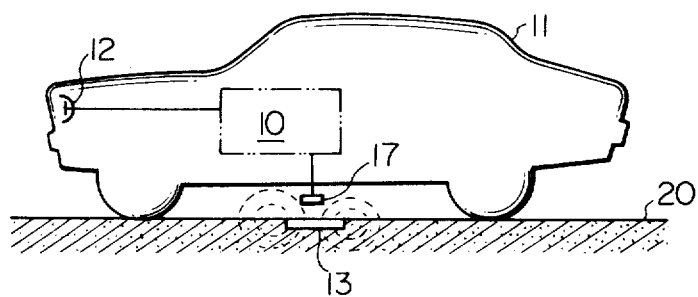
FIG. 1 is a side elevation of an automotive vehicle in which the radar system of the present invention is mounted, as well as the relation between an indicator sensor mounted beneath the vehicle chassis and an indicator embedded under the surface of a roadway.
Figure 2:
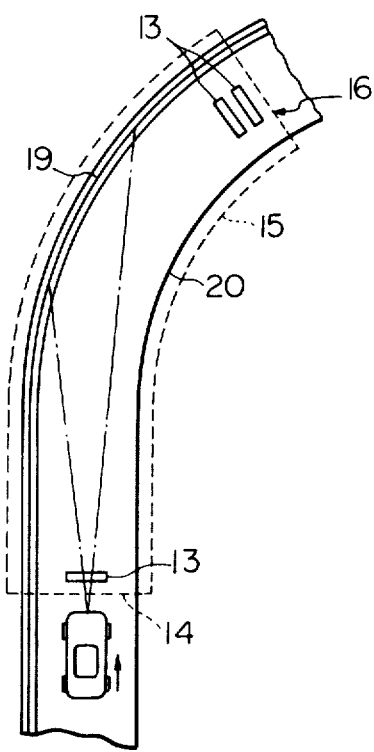
FIG. 2 is a plan view of a range controlled area of the roadway showing the arrangement of the indicators at the entry and exit of the range controlled area in which false objects are located.

Referring now to FIGS. 1 and 2, a radar transmitter-receiver unit 10 of the invention is shown mounted on a motor vehicle 11 with the radar antenna 12 being mounted at the front end of the vehicle. According to one embodiment of the present invention, a source of electromagnetic flux 13 is placed at the entry portion 14 of a range controlled zone 15 as indicated by broken lines on a roadway 20. The source of electromagnetic flux 13 may be a plate-like rectangular permanent magnet or electromagnet embedded beneath the surface of the roadway 20. At the exit portion 16 of the controlled zone 15 is also placed a pair of smaller plate-like rectangular magnets 13 in parallel to each other transverse to the direction along the roadway 20.

The magnetic flux of the magnets 13 is sensed by a Hall generator 17 which is mounted underside of the vehicle 11. As the vehicle 11 passes over the magnets 13, the Hall generator 17 develops an electrical signal in the form of pulses determined by the number of magnets 13 placed on the roadway. The signal will be utilized to control the detectable range of the radar unit 10 as will be described below.

Figure 3A:
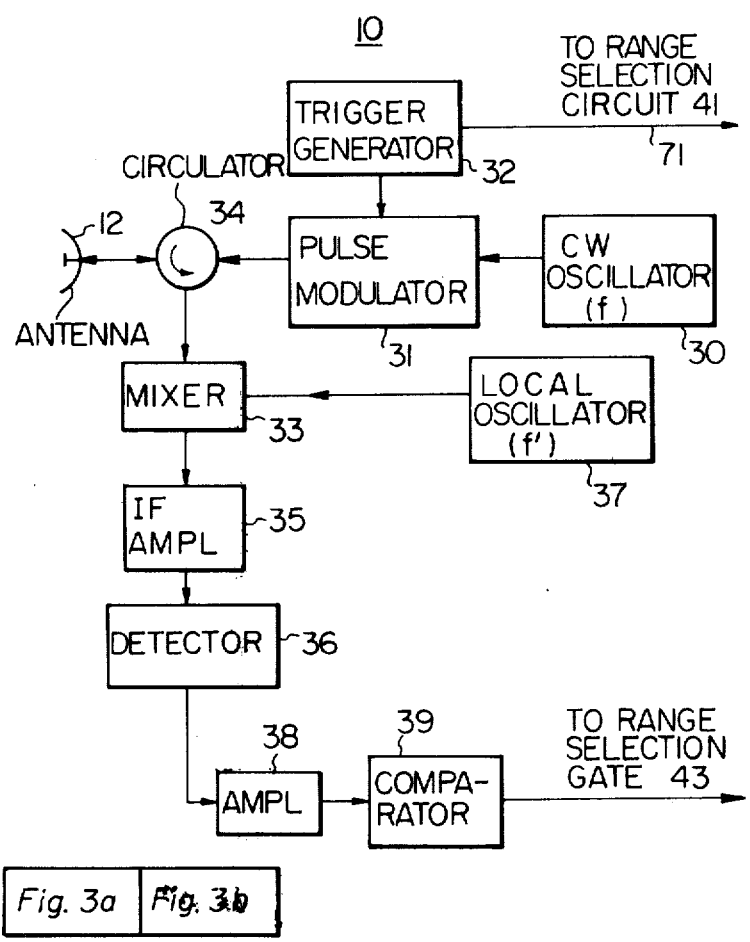
FIG. 3 is a circuit block diagram of a first embodiment of the invention.

In FIG. 3 the radar transmitter-receiver unit 10 is of pulsed radar type, and comprises a continuous wave (CW) oscillator 30 generating a signal at a frequency $f$, a pulse modulator 31, a trigger generator 32, a mixer 33, a circulator 34, an IF amplifier 35, a decoder 40, a range selection circuit 41 and a range indicator 42. Pulse modulator 31 receives trigger pulses from the trigger generator 32 to modulate the continuous wave signal in pulsed form in conventional manner and applies its output to the antenna 12 by way of the circulator 34. A beam of electromagnetic radiation is transmitted from the antenna 12 to objects ahead and a return signal or echo is received by the same antenna 12 and applied to the mixer 33 via the return path of the circulator 34. The return signal is mixed with a reference signal at a frequency $f'$ provided by a local oscillator 37 to produce a beat frequency $f - f'$. The output of the mixer 33 is amplified by the IF amplifier 35 and detected by the detector 36 and amplified by amplifier 38 to a desired level. Because of the low intensity of electromagnetic radiation at the fringe of the beam, the reflected signal would contain various insignificant signal components. A comparator 39 is provided to filter out such insignificant signal components which fluctuate below a predetermined threshold level and deliver a binary digit indicating the presence and absence of a target for alerting the vehicle occupant. When the return signal exceeds the threshold level, the comparator 39 places a "1" binary digit to a range selection gate 43.

Assume that the vehicle is moving outside the controlled zone 15, J-K flip-flop 46 of decoder 40 is in the reset condition and its high $\overline{Q}$ output causes AND gate 52 of the range selection circuit 41 to be enabled to operate the radar unit 10 in the normal mode in which the detectable range of the unit is set, for example, at 50 meters. This range is determined by the duration of a pulse produced by a monostable multivibrator 50 upon receipt of a trigger pulse on lead 71 from the trigger generator 32. The pulse output from the multivibrator 50 on lead 72 is 333 nanoseconds in duration which is passed through the AND gate 52 to the range selection gate 43 by way of OR gate 55 to enable the gate for the duration of 333 nanoseconds. During this enabled period, the output from the comparator 39 is passed through the gate 43.

On the other hand, the trigger signal on lead 74 is concurrently applied to the set terminal of flipflop 60 of the range indicator circuit 42 and brings its Q output to go high. This high Q output enables AND gate 61 and sets a binary counter 62 to start counting pulses provided by a pulse generator 63. The pulse generator 63 generates a train of pulses at a repetition frequency of, for example, 3,000 MHz so that a single count of the pulse corresponds to the distance of 0.5 meters. The counter 62 ceases its counting operation when the flip-flop 60 is reset by the output from the range selection gate 43 by way of OR gate 68. Therefore, the number of counts in the counter 62 is a measure of the distance from the vehicle's front end to the signal reflecting object, and transferred to a shift register 64 in parallel form. The transfer of the contents in counter 62 is made possible by the output from a monostable multivibrator 66. A monostable multivibrator 51 is connected to the output lead 72 of monostable multivibrator 50 to generate a narrow trigger pulse 74-1 (see FIG. 4) at the falling edge of the range defining pulse 72-1 to trigger the monostable multivibrator 66 which provides a read-in pulse 75-1 on lead 75 to cause the shift register 64 to read in the binary information from the counter 62. The binary data stored in the shift register 64 is then transferred to a display device 65 which translates the binary coded signal into a decimal number indicating the distance of the object to be detected. A monostable multivibrator 67 is coupled to the output of monostable multivibrator 66 to produce a pulse 76-1 at the falling edge of the applied pulse 75-1 to clear the counter 62 after transfer of its contents has completed.

When the vehicle 11 has approached the entry line 14 of the range controlled area 15 and moves past the magnet plate 13, the Hall generator 12 produces a voltage in response to the presence of the magnetic flux. The Hall voltage is amplified at 18 and shaped into a pulse 81-1 on lead 81 (see FIG. 5) and applied to a monostable multivibrator 47 of the decoder 40 to produce a pulse 82-1 to enable AND gate 44 to pass the pulse 81-1 to the trigger terminal of the J-K flip-flop 45 which serves as a pulse counter. The flip-flop 45 changes its state and brings its Q output to go high so that a pulse 85-1 is produced on lead 85 and applied to the J terminal of flip-flop 46. The pulse 82-1 on lead 82 is connected to a monostable multivibrator 48 to turn it on to produce a pulse 83-1 on the output lead 83 to trigger the flip-flop 46. The flip-flop 46 in turn brings its Q output on lead 86 to go high to produce a pulse 86-1 which is transmitted on lead 90 to AND gate 54 of the range selection circuit 41. A monostable multivibrator 53 is connected to the output of trigger generator 32 to produce a pulse 73-1 having a duration of 100 nanoseconds which is used to limit the detectable range of the unit 10 to 15 meters. Since AND gate 54 is enabled by the signal on lead 90, the second range defining pulse 73-1 is applied to the range selection gate 43 by way of OR gate 55. This filters out any signal reflected from unwanted objects such as a curved guard rail 19 in the controlled zone 15 alongside the roadway 20 at the instant the vehicle 11 has detected the presence of the entry line 14 of the controlled area 15 which in this example is represented by a single magnetic plate 13. The flip-flop 45 is then cleared by a pulse 84-1 delivered from a monostable multivibrator 49 connected to the output of monostable multivibrator 48 in preparation for the subsequent circuit operation when the vehicle 11 leaves the controlled zone 15 to restore the detectable range to the normal value, while flip-flop 45 remains unchanged.

Figure 6:
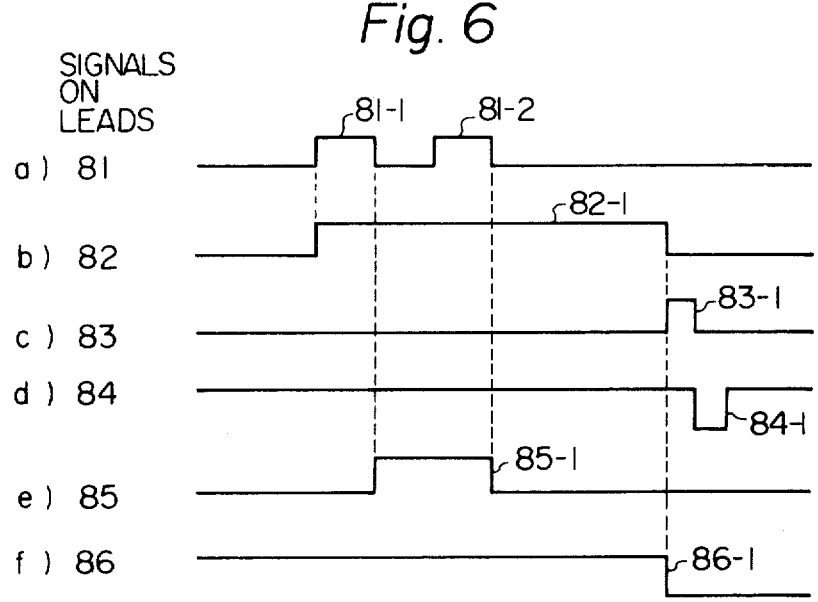

When the magnets 13 placed in the neighborhood of the exit line 16 are sensed during a predetermined time interval by the Hall generator 17 as the vehicle 11 leaves the range controlled zone 15, two pulses 81-1' and 81-2' are produced on lead 81 (FIG. 6). When these pulses occur within the duration of the enabling pulse 82-1 provided by the monostable multivibrator 47, these pulses are recognized as a signal indicating the presence of the exit line 16, and applied to the counter flip-flop 45 which at the falling edge of the first pulse 81-1 brings its Q output on lead 85 to go high and allows it to go low at the falling edge of the second pulse 81-2 (FIG. 6e). Since the signal on lead 86 remains high, the occurrence of trigger pulse 83-1 on lead 83 causes the flip-flop 46 to return to the first stage in which the $\overline{Q}$ output goes high transmitting an enabling signal on lead 91 to AND gate 52, while removing the enabling signal from lead 90 to disable the AND gate 54. The signal on lead 84 is again applied to the clear terminal of flip-flop 45 to cancel its output preparatory for the range control at the entry of the next range controlled zone.

Figure 7:
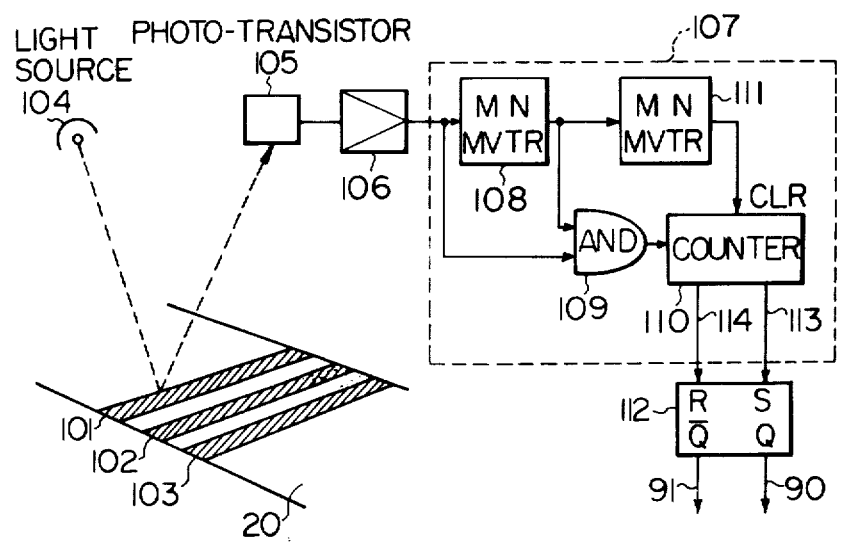
FIG. 7 is the circuit block diagram in alternative form of a portion of the circuit of FIG. 3 to detect the presence of the indicators.

The detection of the entry and exit lines of a controlled area 15 may alternatively be effected by an arrangement in which the surface of the roadway 20 is marked with a plurality of transverse stripes of a color having different light reflectivity from the road surface. For example, the entry region of the range controlled area is marked with three transverse parallel stripes 101, 102 and 103 within a predetermined distance along the roadway 20 as illustrated in FIG. 7. In this arrangement, a light source 104 and a photo-transistor 105 are mounted on the vehicle 11 to take the place of the Hall generator 17 of the previous embodiment. The light source 104 emits a beam of light to the surface of the roadway 20 and the photo-transistor 105 is so mounted as to receive the reflected light to detect the change in light intensity as the vehicle 11 moves across the stripes 101 to 103. A series of 3 pulses is produced at the output of photo-transistor 105, amplified at 106 and fed into the decoder 107. The input pulses are applied to a timing monostable multivibrator 108 which enables AND gate 109 to pass the input signal to a counter 110. The function of the multivibrator 108 is to produce a pulse of a duration in which a predetermined number of pulses is counted to distinguish the entry and exit portions of the controlled region 15. When the number of counts in counter 110 has reached three, the counter 110 energizes a lead 113 to change the state of a flip-flop or switch 112. The Q and $\bar{Q}$ output leads of the flip-flop 112 are connected to AND gates 54 and 52 of the range selection circuit 41 over the conductors 90 and 91, respectively. The AND gate 54 is thus enabled to pass a narrow range pulse provided by the monostable multivibrator 53.

The exit region of the area 15 may be marked with five parallel transverse stripes (not shown). As the vehicle 11 moves past the exit way, the counter 110 will be operated to energize lead 114 to reset the flip-flop 112 to restore the mode of operation of unit 10 to the normal range.

Figure 8:
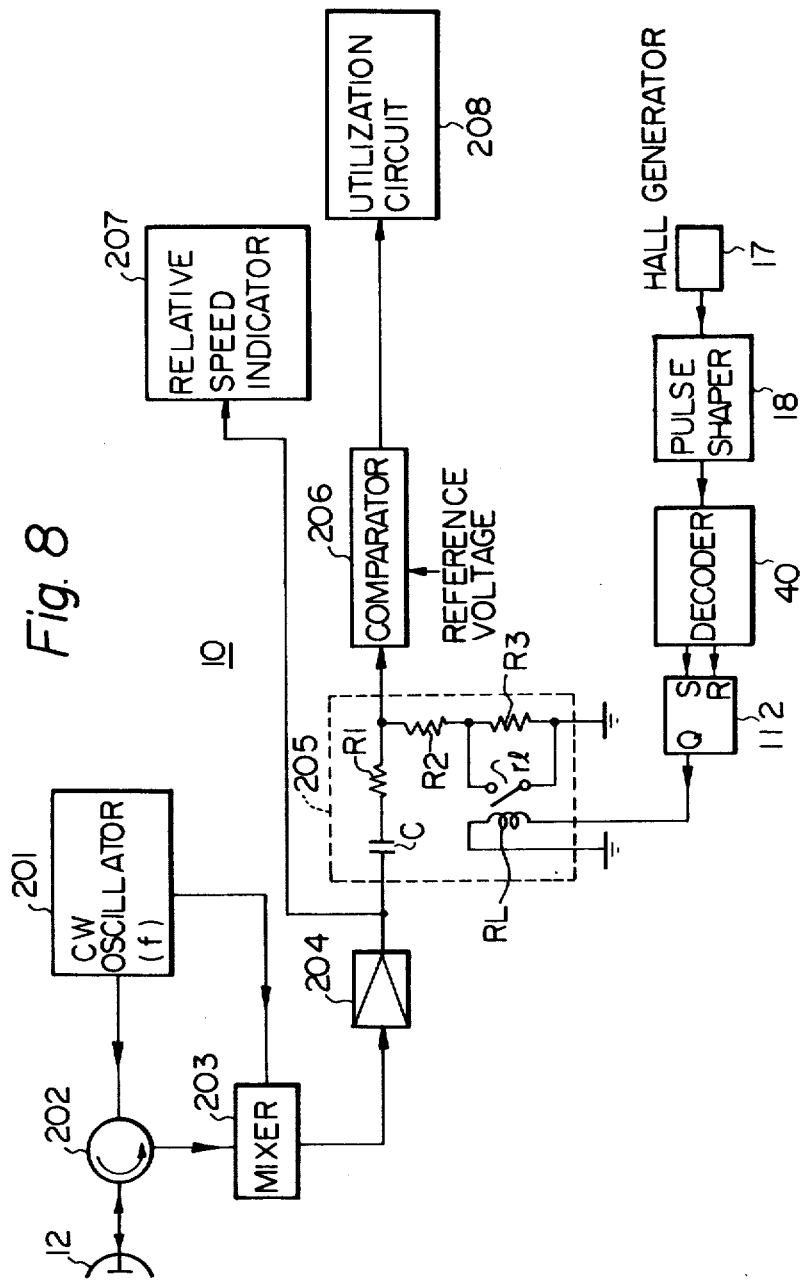
FIG. 8 is a circuit block diagram of a second embodiment of the invention.

The circuit shown in FIG. 8 illustrates another embodiment in which the concept of the present invention is applied to a Doppler radar system. The Doppler version of the unit 10 comprises a continuous wave oscillator 201 which provides a signal at a frequency $f$ to the antenna 12 by way of circulator 202 on the one hand and delivers the same signal to a mixer 203 on the other hand. As is well known, the signal obtained at the output of mixer 203 represents the speed of the vehicle 11 relative to an object from which the signal is returned. The signal at the output of mixer 203 is also utilized to approximate the distance between the vehicle 11 and the object since the intensity of a signal is inversely proportional to the distance it has travelled.

In the mixer 203, the returned signal via the antenna 12 and the circulator 202 and the direct signal from the oscillator 203 are combined to produce a signal at a beat frequency $f - f'$ ($f'$ being the frequency of the returned signal) which is amplified by an amplifier 204 and applied to a voltage control circuit 205 which provides voltage control in response to the signal from the decoder 40 previously referred to. The output of voltage control circuit 205 is coupled to a comparator 206 to provide an output when the input signal is above a reference voltage to eliminate signals whose intensity is below the reference or threshold level. The amplifier output is coupled to a known relative speed indicator 207 to determine the speed of the vehicle 11 relative to objects ahead in a conventional manner. The output from the comparator 206 is coupled to a utilization circuit 208 which recognizes the presence of a signal at the output of comparator 208 as an indication that the vehicle is approaching an object in front.

When the vehicle 11 moves past the entry indicating magnets 13, the entry to the controlled zone 15 is sensed by the decoder 40 in the same manner as described in the previous embodiment. The flip-flop 112 is switched to the set condition to bring its Q output to go high. This high Q output energizes a relay RL of the voltage control circuit 205 to close its contacts rl. In the voltage control circuit 205, a resistor R3 is coupled in series circuit with a resistor R2 to form a current bypass circuit. On closure of contacts rl, the resistor R3 is short-circuited. This reduces the total resistance of the bypass circuit to increase the current that is bypassed to ground. The output from the amplifier 204 is coupled to the comparator 206 by way of a filtering network comprising a capacitor C and a resistor R1 and attenuated by the bypass circuit, so that the output from voltage control circuit 205 is lowered by a predetermined amount. The comparator 206 compares the output from voltage control circuit 205 with the reference voltage and provides an output when the input signal is above the threshold value and the utilization circuit 208 recognizes this output as an indication that an object ahead is detected within the reduced range and provides automatic braking or alarming operation.

When the vehicle 11 leaves the controlled zone 15, the exit line 16 is sensed by the decoder 40' as in the previous embodiment and deenergizes the relay RL to open its contacts rl. This removes the attenuation in the circuit 205 and the range of signals to be detected is increased to the normal value.

The entry and exit indicating magnets or markings may be located at places between a highway lane and a traffic congested area in order to control the detectable range of the unit 10 when the vehicle 11 is in the traffic congested area to avoid radar clutter which might be caused by the surrounding stationary objects.

What is claimed is:

1. A method for discriminating unwanted echo signals reflected from false targets in a controlled zone upon emission of a beam of electromagnetic radiation from a motor vehicle when the vehicle trespasses the controlled zone, comprising the steps of:
   a. placing an indication at the entry and exit portions of the controlled zone;
   b. sensing the indication at the entry portion when the vehicle enters the controlled zone;
   c. reducing the detectable range of the signals reflected from the stationary objects in the controlled zone in response to the sensing of said indication at the entry portion;
   d. sensing the indication at the exit portion when the vehicle leaves the controlled zone; and
   e. restoring said detectable range to the normal value in response to the sensing of said indication at the exit portion.

2. A method as claimed in claim 1, wherein the step (a) includes embedding a source of magnetic flux beneath the surface of a roadway at the entry and exit portions of the controlled zone.

3. A method as claimed in claim 1, wherein the step (a) includes marking stripes on the surface of a roadway transverse to the direction of the roadway at the entry and exit portions.

4. A radar system mounted on a motor vehicle for detecting the presence of an object in front of the vehicle, comprising:
   means for transmitting a beam of electromagnetic radiation;
   means for receiving a signal reflected from the object;
   means for sensing the presence of a predetermined zone through which the vehicle passes; and
   means responsive to the sensing means for limiting the range of the reflected signal to a short range when the vehicle moves in said zone and restoring said range to a long range when the vehicle leaves the zone.

5. A radar system mounted on a motor vehicle and having means for transmitting a beam of electromagnetic radiation in pulsed form, and means for receiving a signal reflected from an object in front of the vehicle, the radar system comprising;
   means for sensing a predetermined zone when the vehicle is moving in said zone;
   a range selection gate coupled to the receiving means;
   gate control circuit means for controlling the range selection gate to enable same in a short interval when the predetermined zone is sensed and to enable same in a long interval when the vehicle is outside of said zone; and
   means responsive to the emission of the pulsed beam and to the occurrence of an output from the range selection gate for measuring the time interval between the emission of the beam and the reception of the reflected signal.

6. A radar system mounted on a motor vehicle and having means for transmitting a beam of electromagnetic radiation in pulsed form, and means for receiving a signal reflected from an object in front of the vehicle, the radar system comprising:
   means for sensing the entry and exit portions of a predetermined zone through which the vehicle passes;
   switch means having a first steady state responsive to the sensing of the entry portion and second steady state responsive to the sensing of the exit portion;
   a range selection gate coupled to the receiving means;
   gate control circuit means for controlling the range selected gate to enable same in a short interval when the switch means is in the first steady state and to enable same in a long interval when the switch means is in the second steady state; and
   means responsive to the emission of the pulsed beam and to the occurrence of an output from the range selection gate for measuring the time interval between the emission of the beam and the reception of the reflected signal.

7. A radar system as claimed in claim 6, wherein the entry and exit portions of the predetermined zone are provided with sources of magnetic flux, and wherein the sensing means includes means responsive to the magnetic flux generated at said entry and exit portions and a counter coupled to the magnetic responsive means to count the number of said sources of magnetic flux.

8. A radar system as claimed in claim 6, wherein the entry and exit portions are provided with stripes of different light reflectivity from a roadway, and wherein the sensing means includes a light source emitting a beam of light to the surface of the roadway, a light sensitive element arranged to receive light reflected from the surface of the roadway, and a counter coupled to the light sensitive element to count the number of said stripes.

9. A Doppler radar system mounted on a motor vehicle and having means for transmitting a beam of electromagnetic radiation, means for receiving a signal reflected from an object in front of the vehicle, a mixer coupled to the transmitting and receiving means to provide a Doppler frequency signal, and means coupled to the mixer means for converting the Doppler frequency signal into a signal representing the speed of the vehicle relative to the object, said radar system comprising: means coupled to the mixer for converting the Doppler frequency signal into a unidirectional voltage signal; means for comparing the unidirectional voltage signal with a threshold level to provide an output when the unidirectional voltage is above the threshold level; means for sensing a predetermined zone when the vehicle is moving therein; control means for decreasing the difference in level between the unidirectional voltage and the threshold level by a predetermined amount in response to the sensing of the predetermined zone and restoring said difference in level when the vehicle is outside of said zone; and means coupled to the comparing means to utilize the output therefrom.

10. A doppler radar system mounted on a motor vehicle and having means for transmitting a beam of electromagnetic radiation, means for receiving a signal reflected from an object in front of the vehicle, a mixer coupled to the transmitting and receiving means to provide a Doppler frequency signal, and means coupled to the mixer means for converting the Doppler frequency signal into a signal representing the speed of the vehicle relative to the object, said radar system comprising: means coupled to the mixer for converting the Doppler frequency signal into a unidirectional voltage signal with a threshold level to provide an output when the unidirectional voltage is above the threshold level; means for sensing the entry and exit portions of a predetermined zone through which the vehicles passes; switch means having a first steady state responsive to the sensing of the entry portion and a second steady state responsive to the sensing of the exit portion; control means for decreasing the difference in level between the unidirectional voltage and the threshold level by a predetermined amount when the switch means is in the first steady state and restoring said difference in level when the switch means is in the second steady state, and means coupled to the comparing means to utilize the output therefrom.

11. A Doppler radar system as claimed in claim 9, wherein said control means comprises means coupled to the sensing means for providing attenuation to the unidirectional voltage signal in response to the sensing of the entry portion and removing the attenuation in response to the sensing of the exit portion.

* * * * *